United States Patent
Kawakita

(10) Patent No.: US 8,464,274 B2
(45) Date of Patent: Jun. 11, 2013

(54) INFORMATION PROCESSING SYSTEM, PROGRAM AND DATA RELAY METHOD

(75) Inventor: Masaru Kawakita, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

(21) Appl. No.: 13/000,857

(22) PCT Filed: Jun. 25, 2009

(86) PCT No.: PCT/JP2009/061573
§ 371 (c)(1),
(2), (4) Date: Apr. 26, 2011

(87) PCT Pub. No.: WO2010/001797
PCT Pub. Date: Jan. 7, 2010

(65) Prior Publication Data
US 2011/0191792 A1    Aug. 4, 2011

(30) Foreign Application Priority Data

Jul. 4, 2008   (JP) ................................ 2008-175457

(51) Int. Cl.
*G06F 13/00*   (2006.01)
(52) U.S. Cl.
USPC ......................................... 719/313; 719/330
(58) Field of Classification Search
USPC ................................................ 719/313, 330
See application file for complete search history.

(56) References Cited

U.S. PATENT DOCUMENTS

| | | | | |
|---|---|---|---|---|
| 5,566,302 | A | * | 10/1996 | Khalidi et al. ................ 719/312 |
| 8,255,921 | B2 | * | 8/2012 | Arvidsson et al. ............ 719/311 |
| 2009/0288098 | A1 | * | 11/2009 | Abd-El-Malek et al. ..... 719/312 |

FOREIGN PATENT DOCUMENTS

| | | |
|---|---|---|
| JP | 6-332834 A | 12/1994 |
| JP | 7-253943 A | 10/1995 |
| JP | 10-074149 A | 3/1998 |
| JP | 2002108631 A | 4/2002 |
| JP | 2004094845 A | 3/2004 |
| JP | 2004295898 A | 10/2004 |

OTHER PUBLICATIONS

International Search Report for PCT/JP2009/061573 mailed Sep. 15, 2009.
Japanese Office Action for JP 2010-519018 mailed on Apr. 18, 2013 with English Translation.

* cited by examiner

Primary Examiner — Andy Ho

(57) ABSTRACT

An information processing system includes a first process, a second process, a management process and a relay process. The first process executes a predetermined process and communicates with other processes. The second process is started in response to a start request sent from the first process and executes a predetermined process. The management process manages communication between the first process and the second process. The relay process receives, from the first process, the start request to the second process and usage data used in the first process and the second process. The relay process further starts the second process by proxy, transfers the usage data to the second process, and notifies the management process of the start of the second process.

13 Claims, 5 Drawing Sheets

INFORMATION PROCESSING SYSTEM, PROGRAM AND DATA RELAY METHOD

TECHNICAL FIELD

The present invention relates to an information processing system. The present invention relates to, in particular, an information processing system which manages communication between processes which execute predetermined processes.

BACKGROUND ART

There are two kinds of methods of generating a process in a general computer system. A first method is as shown in FIG. 1, wherein a parent process (a process A101) directly generates a child process (a process B102). If data is shared between the parent process (the process A101) and the child process (the process B102), the data needs to be shared immediately after generating a new process. Here, there is constraint such that data to be shared and a command to generate a child process need to be transferred simultaneously from a parent process to a process which serves as a main subject to generate the child process. In an example of FIG. 1, the parent process (the process A101) transfers shared data to the child process (the process B102) at the same time as commanding to generate the child process (the process B102).

A second method of generating a process is to issue a command from a parent process to a resident third party process so that the third party process which received such a command generates a child process by proxy. For example, when "RPC: Remote Procedure Call" is executed in a computer system, in the case that there is no callee process, a third party process which integrally controls the RPC generates a callee process in place of a caller process.

A procedure in the RPC according to the above proxy generation will be described with reference to FIG. 2. Firstly, a parent process (a process A201) requests a third party process 203 to generate a child process (a process B202). At this time, if there is data required from the beginning of generating the child process (the process B202), the parent process (the process A201) deposits it in the third party process 203. Then, the third party process 203 generates, in response to reception of the request, the child process (the process B202) by proxy and transfers the deposited data to the child process (the process B202). Thereafter, the RPC is executed continuously only between the parent process (the process A201) and the child process (the process B202) until one of them declares closure of the RPC. The third party process 203 then monitors the RPC of them. If communication interruption occurs unexpectedly in the middle, the third party process 203 carries out an exceptional process such as returning an error to both processes.

As a related art, there are known JP-A-Heisei 7-253943 (patent literature 1) and JP-P 2004-295898A (patent literature 2). The patent literature 1 discloses a system configured to be provided with a relay machine between a RPC server and a client. The patent literature 2 discloses a method to expand a process in the RPC.

CITATION LIST

Patent Literature
  Patent literature 1: JP-A-Heisei 7-253943
  Patent literature 2: JP-P 2004-295898A

SUMMARY OF INVENTION

However, the above techniques are accompanied by a problem such that data which should be confidential is leaked via a third party process. It will be described in detail. There is considered a case that, under an environment in which the above constraint is present, confidential data which should be shared only between processes in a parent and child relationship is present. In this case, according to the first method shown in FIG. 1, the child process can receive confidential data directly from the parent process. However, in the case of the second method shown in FIG. 2, confidential data which should be shared only between the parent and child processes needs to be deposited once in the third party process. Accordingly, when confidential data is deposited in the third party process, a problem arises such that confidential data is leaked via the third party process. If, in particular, the third party process is configured by a general function mounted in an operating system, such a problem of information leakage from the third party process is serious.

An object of the present invention is to improve security by suppressing information leakage in an information processing system as stated above.

In one aspect of the present invention, an information processing system is provided. The information processing system is provided with a first process, a second process, a management process and a relay process. The first process executes a predetermined process and communicates with other processes. The second process is started in response to a start request sent from the first process and executes a predetermined process. The management process manages communication between the first process and the second process. The relay process receives, from the first process, the start request to the second process and usage data used in the first process and the second process. The relay process further starts the second process by proxy, transfers the usage data to the second process, and notifies the management process of the start of the second process.

In another aspect of the present invention, a program is provided to cause a computer to realize a process below. The process includes a first process, a second process, a management process and a relay process. The first process executes a predetermined process and communicates with other processes. The second process is started in response to a start request sent from the first process and executes a predetermined process. The management process manages communication between the first process and the second process. The relay process receives, from the first process, the start request to the second process and usage data used in the first process and the second process. The relay process further starts the second process by proxy, transfers the usage data to the second process, and notifies the management process of the start of the second process.

In still another aspect of the present invention, a data relay method is provided in the information processing system. The information processing system is provided with a first process, a second process, a management process and a relay process. The first process executes a predetermined process and communicates with other processes. The second process is started in response to a start request sent from the first process and executes a predetermined process. The management process manages communication between the first process and the second process. The data relay method includes: (a) a step of the relay process receiving, from the first process, the start request to the second process and usage data used in the first process and the second process; (b) a step of the relay process starting the second process by proxy; (c) a step of the relay process transferring the usage data to the second process; and (d) a step of the relay process notifying the management process of the start of the second process.

According to the present invention, security can be improved by efficiently suppressing information leakage in the information processing system.

BRIEF DESCRIPTION OF DRAWINGS

The above and other objects, advantages and features of the present invention will be more apparent from the following description of certain preferred exemplary embodiments taken in conjunction with the accompanying drawings, in which.

DESCRIPTION OF EMBODIMENTS

Figure 1:
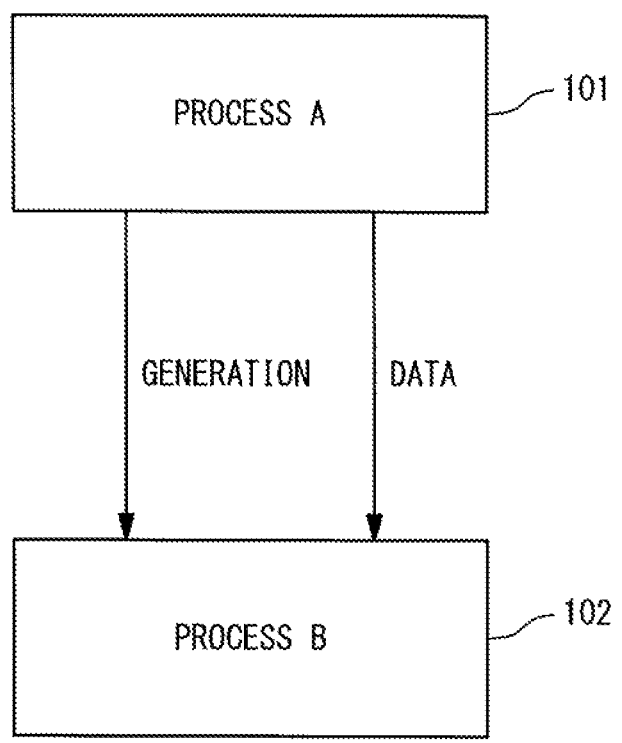
FIG. 1 is a view to describe a method in which a parent process directly generates a child process.
Figure 2:
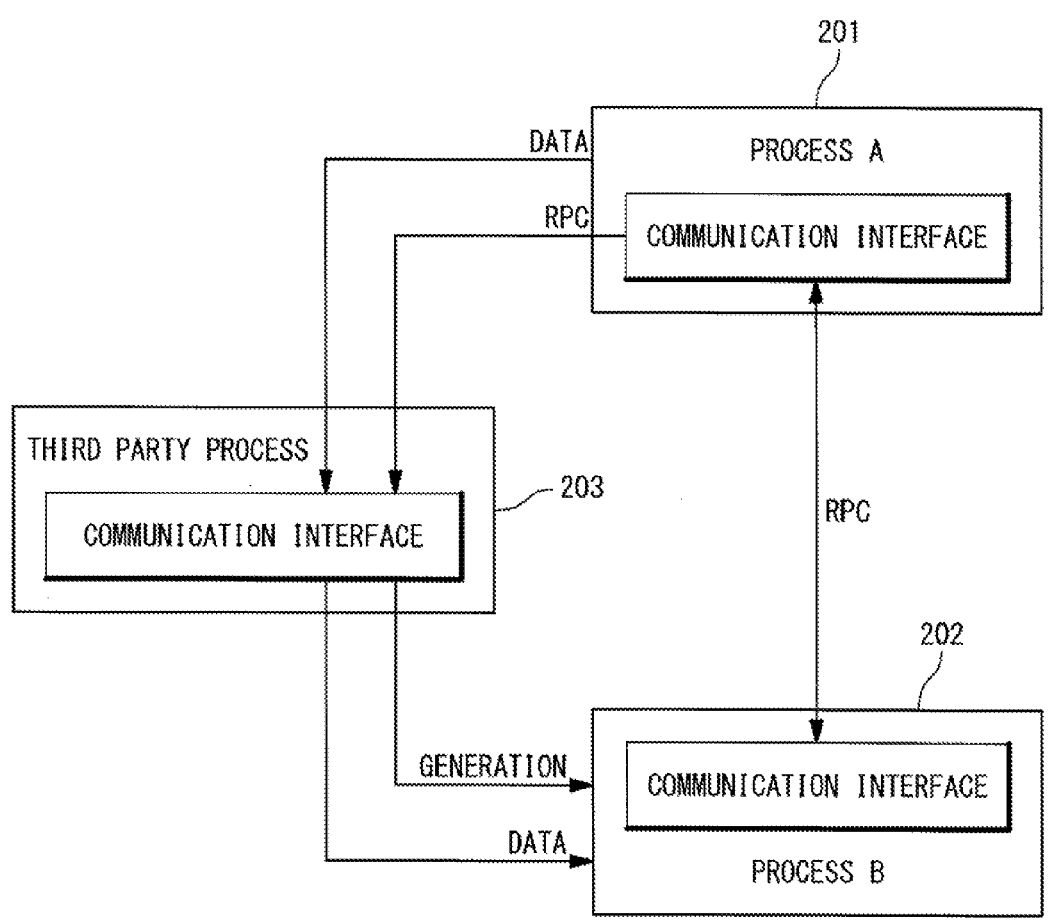
FIG. 2 is a view to describe a method in which a child process is generated by using a third party process in a case accompanied by RPC.

An information processing system according to the present invention suppresses notification of data to a process which is irrelevant to a process for processing the data. Accordingly, information leakage is suppressed efficiently with improved security.

In one aspect of the present invention, an information processing system is provided. The information processing system is provided with a first process, a second process, a management process and a relay process. The first process executes a predetermined process and communicates with other processes. The second process is started in response to a start request sent from the first process and executes a predetermined process. The management process manages communication between the first process and the second process. The relay process receives, from the first process, the start request to the second process and usage data used in the first process and the second process. The relay process further starts the second process by proxy, transfers the usage data to the second process, and notifies the management process of the start of the second process.

According to the above invention, when the first process starts the second process, the first process transmits, to the relay process, the start request to the second process and usage data used in the first process and the second process. In response to the request, the relay process starts the second process as requested and also transfers the received usage data to the second process. The second process is therefore started and allowed to execute a predetermined process by using the received usage data. The relay process also notifies the management process, which manages communication among processes, of the start of the second process.

The usage data transferred from the first process to the second process is thus prevented from being notified to the management process which manages communication between the processes. Accordingly, the leakage of the usage data is suppressed efficiently. As a result, security in the information processing system is improved.

The information processing system may be further provided with a transmission destination setting unit configured to set the relay process as a transmission destination of data sent from the first process to the second process.

The management process includes a function to receive, from a process, a request to start another process and starts another process by proxy. In this case, the transmission destination setting unit changes a transmission destination of data, which is sent from the first process to the second process, from the management process to the relay process.

The information processing system may be further provided with a process starting unit configured to start the first process and transfer the usage data to the first process. When the process starting unit starts the first process, the transmission destination setting unit sets the relay process as a transmission destination of data sent from the first process to the second process.

The management process may also be realized by a function which is pre-implemented in an operating system installed in the information processing system.

Therefore, data sent from the first process to the second process is always transmitted to the relay process. Accordingly, as stated above, the second process is subjected to a proxy start by the relay process and usage data is transferred to the second process. In other words, even if the management process which is realized by a function or the like pre-implemented in an operating system has a function to start a process by proxy, it does not starts the second process in place of the first process. As a result, it is efficiently suppressed to leak usage data used in the first process and the second process to the management process and security is further improved.

The relay process may also determine, based on preset determination reference information, whether or not data received from the first process and sent to the second process includes the start request to the second process. If the data includes the start request to the second process, the relay process starts the second process by proxy.

If data received from the first process and sent to the second process does not include the start request to the second process, the relay process relays and transmits data received from the first process to the second process.

In another aspect of the present invention, a program to cause a computer to realize a process below is provided. The process includes a first process, a second process, a management process and a relay process. The first process executes a predetermined process and communicates with other processes. The second process is started in response to a start request sent from the first process, and executes a predetermined process. The management process manages communication between the first process and the second process. The relay process receives, from the first process, the start request to the second process and usage data used in the first process and the second process. The relay process further starts the second process by proxy, transfers the usage data to the second process, and notifies the management process of the start of the second process. The program may also be recorded in a recording medium which is readable by a computer.

The program may further cause a computer to realize a transmission destination setting unit configured to set the relay process as a transmission destination of data sent from the first process to the second process.

The program may further cause a computer to realize a process starting unit configured to start the first process and transfer usage data to the first process. In this case, when the process starting unit starts the first process, the transmission destination setting unit sets the relay process as a transmission destination of data sent from the first process to the second process.

In still another aspect of the present invention, a data relay method is provided in an information processing system. The information processing system is provided with a first process, a second process, a management process and a relay process. The first process executes a predetermined process and communicates with other processes. The second process is started in response to a start request sent from the first process, and executes a predetermined process. The management process manages communication between the first process and the second process. The data relay method includes: (a) a step of the relay process receiving, from the first process, the start request to the second process and usage data used in the first process and the second process; (b) a step of the relay process starting the second process by proxy; (c) a step of the relay process transferring the usage data to the second process; and (d) a step of the relay process notifying the management process of the start of the second process.

The data relay method may further include a step of setting the relay process as a transmission destination of data sent from the first process to the second process.

The data relay method may further include a step of starting the first process and transferring the usage data to the first process. In this case, when the first process is started, the relay process is set as a transmission destination of data sent from the first process to the second process.

The program or the data relay method as described above also demonstrates actions similar to those of the information processing system, and makes it possible to achieve the aforementioned object of the present invention.

<First Exemplary Embodiment>

Figure 3:
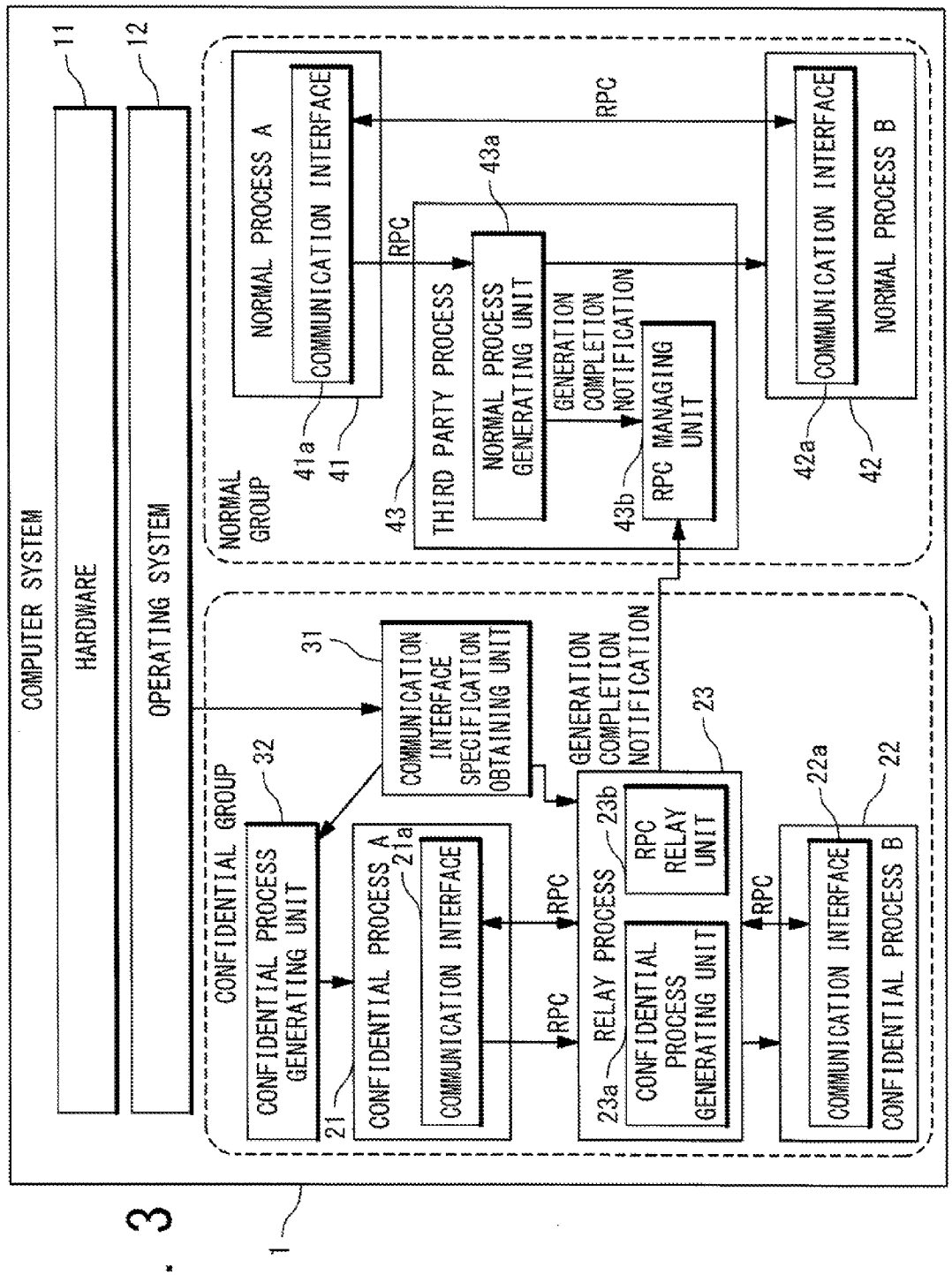
FIG. 3 is a functional block diagram showing a configuration of a computer system according to an exemplary embodiment of the present invention.
Figure 4:
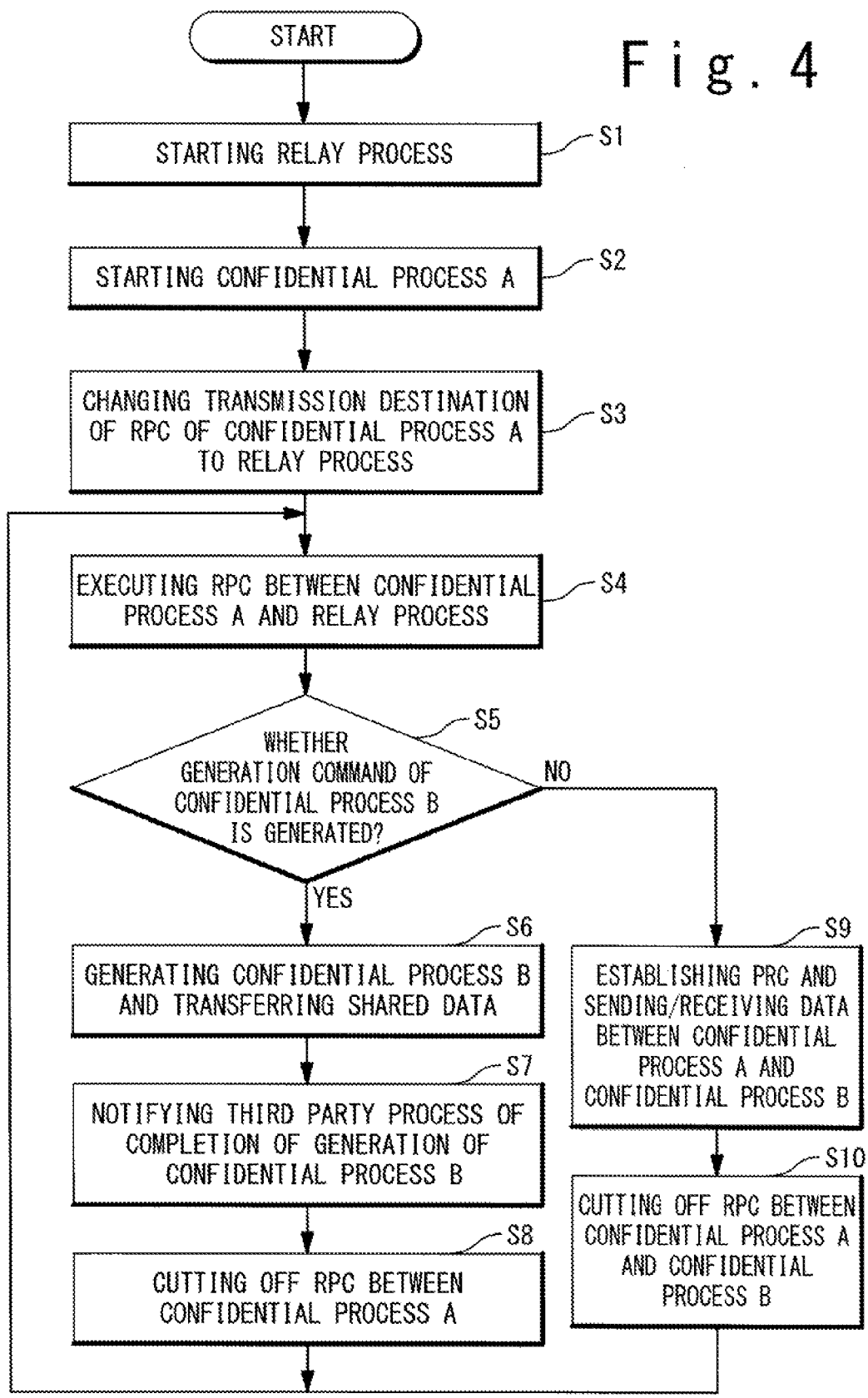
FIG. 4 is a flowchart showing an operation of the computer system according to the exemplary embodiment of the present invention.
Figure 5:
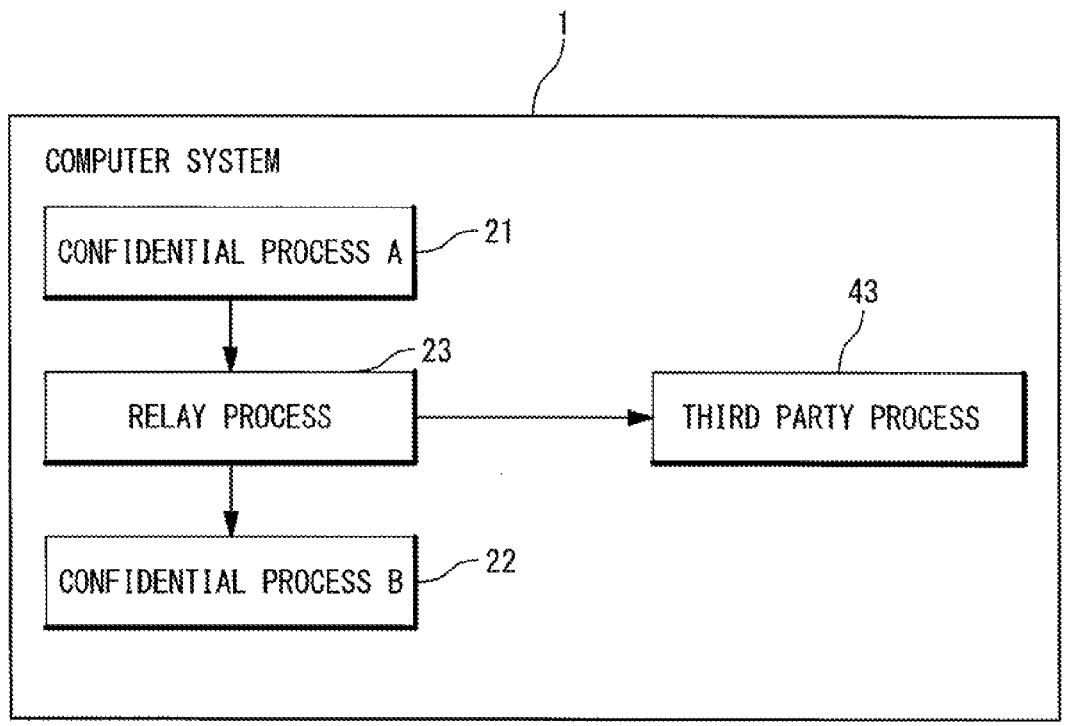
FIG. 5 is a functional block diagram showing another example of a configuration of the computer system according to the exemplary embodiment of the present invention.

A first exemplary embodiment of the present invention will be described below with reference to FIGS. 3 to 5. FIG. 3 is a functional block diagram showing a configuration of a computer system 1 according to the present exemplary embodiment. FIG. 4 is a flowchart showing an operation of the computer system 1 according to the present exemplary embodiment. FIG. 5 is also a functional block diagram showing another configuration of the computer system 1 according to the present exemplary embodiment.

[Configuration]

The computer system 1 (information processing system) shown in FIG. 3 is a general computer (information processing apparatus) provided with a hardware 11 including an arithmetic processing device and a memory device (e.g. hard disk drive and flush memory). Note that the computer system 1 may be configured by a single computer and may also be configured by a plurality of computers.

The computer system 1 further includes an operating system 12 and a plurality of processes. The operating system 12 is constructed by integrating a program in a computing device. Each of the processes is activated on the operating system 12 and executes a predetermined process. More specifically, the plurality of the processes operated on the operating system 12 includes a normal process A41, a normal process B42, a third party process 43, a confidential process A21, a confidential process B22, and a relay process 23. The computer system 1 further includes, as a process activated on the operating system 12, a communication interface specification obtaining unit 31 and a confidential process generating unit 32. Each configuration will be described below in detail.

The operating system 12 is basic software to manage basic operations in the computer system 1 as a whole. The operating system 12 has a function to refer to communication interface specifications. That is, any programs such as each of the above processes and units can use and understand communication interface specifications. Note that communication interface specifications regulate a format of transmitted data when the RPC (Remote Procedure Call) is carried out in the computer system 1. The RPC also refers to communication among the processes, for example, transmission of a command such as a start request and predetermined data from a process to another process.

The normal process A41 (a predetermined process) and the normal process B42 (another process) are in a parent and child relationship to each other. More specifically, the normal process A41 can request a start (generation) of the normal process B42 through the RPC by using a communication interface 41a. The normal process B42 is started by receiving a start request sent from the normal process A91 by using a communication interface 92a through the RPC.

Similarly, the confidential process A21 (a first process) and the confidential process B22 (a second process) are in a parent and child relationship to each other. More specifically, the confidential process A21 can request a start (generation) of the confidential process B22 through the RPC by using a communication interface 21a. The confidential process B22 is started by receiving a start request sent from the confidential process A21 by using in a communication interface 22a through the RPC.

Each of the confidential processes A21 and B22 also executes a process using shared data being confidential (such as usage data and confidential data). The confidential process A21 has a function to transmit the shared data along with the RPC for a start request to the confidential process B22. Note that each of the above normal processes A41 and B42 and the confidential process A21 and B22 is an application to execute a predetermined process such as, for example, a document creation application and a spreadsheet application.

The communication interface specification obtaining unit 31 reads any communication interface specifications registered in the operating system 12. Then, the communication interface specification obtaining unit 31 transmits, to the confidential process generating unit 32 and the relay process 23 to be described later, contents of communication interface specifications. The communication interface specifications include, for example, RPC determination reference information. The RPC determination reference information is used in determining, in the relay process 23 to be described later, whether or not RPC is a start request to induce a confidential process.

The confidential process generating unit 32 has a function (a process starting unit) to, based on an operation command and data subjected to process inputted by a user or the like, start the above confidential process A21 and simultaneously transfer the above shared data to the confidential process A21. Note that the confidential process A21 started by the confidential process generating unit 32 is, as shown by a broken line in FIG. 3, categorized in a confidential group. The relay process 23 and the confidential process B22, each of which can hold confidential usage data, are also categorized in the confidential group. Other processes including the normal process A41, the normal process B42 and the third party process 43 are categorized in a normal group.

The confidential process generating unit 32 further has a function (a transmission destination setting unit) to change setting of a transmission destination of RPC using the communication interface 21a of the started confidential process A21 from the preset third part process 43 to the relay process 23. Therefore, RPC including a start request transmitted from the confidential process A21 to the confidential process B22 and shared data to be shared between the processes are always transmitted to the relay process 23.

The relay process 23 is activated by being started as a resident process at the same time as starting activation of the operating system 12. The relay process 23 has a function to receive the RPC transmitted from the confidential process A21 so as to relay and transmit the RPC to the confidential process B22 which is set as a destination of the RPC. More specifically, the relay process 23 reads contents of the received RPC and confirms the contents. The relay process 23 has a function to generate, if the RPC includes information to request a start of the confidential process B22 as a new process using the third party process 43, the confidential process B22 in place of the third party process. The relay process 23 also has a function to transfer, based on the start of the confidential process B22, shared data, which was transmitted from the confidential process A21 along with the above RPC, to the confidential process B22. The relay process 23 further has a function to notify, thereafter, the third party process 43 of the generation of the confidential process B22.

The relay process 23 also receives communication interface specifications from the above communication interface specification obtaining unit 31. Based on the communication interface specifications, the relay process 23 determines whether or not information included in the RPC received from the confidential process A21 is a request to start the confidential process B22. That is, the relay process 23 determines, based on RPC determination reference information included in the communication interface specifications, a state of the RPC actually transmitted from the confidential process A21. Then, if the RPC is a start request, the relay process 23 generates, as stated above, the confidential process B22 and transfers the shared data to the confidential process B22 (by a confidential process generating unit 23a). In contrast, if the RPC is not a start request, the relay process 23 relays, based on contents of the RPC, communication between the confidential process A21 and the confidential process B22 (by an RPC relay unit 23b).

The third party process 43 (a management process) is, for example, a resident process provided in a general computer system. The third party process 43 has a function (a normal process generating unit 43a) to generate a communication destination process of RPC based on a request of a communication source process. In the example of FIG. 3, the third party process 43 generates the normal process B42 by receiving a request transmitted from the normal process A41 to start the normal process B42.

The third party process 43 also has a function (an RPC managing unit 43b) to manage RPC executed among the entire processes. Accordingly, the third party process 43 allows continuous interaction between the normal process A41 and the normal process B42 and notifies, in unexpected communication interruption, both processes of an exception. The third party process 43 further manages RPC executed between the processes in the confidential group. That is, the RPC managing unit 43b of the third party process 43 allows continuous interaction between the confidential process A21 and the confidential process B22 by receiving, from the relay process 23, a notification to complete generation of the confidential process B22, and notifies both processes of an exception in unexpected communication interruption.

As described above, the relay process 23 and the third party process 43 coincide to each other in an aspect of having a function to generate a new child process (i.e. the confidential process B22 and the normal process B42) which is requested to start by a parent process (i.e. the confidential process A21 and the normal process A41). However, the relay process 23 differs from the third party process 43 in a following aspect. That is, the relay process 23, which generates the confidential process B22 involved in confidential shared data, does not generate the normal process B42 which is not involved in the shared data. In contrast, the third party process 43 generates the normal process B42.

[Operation]

An operation of the computer system 1 according to the present exemplary embodiment will be described below with reference to a flowchart of FIG. 4.

Step 1:

Firstly, the computer 1 starts the relay process 23 at the same time as starting the operating system 12.

Step S2 (Process Starting Step):

It is assumed that, in the computer system 1, the confidential process A21 programmed to generate the confidential process B22 as a new process by using the third party process 43 is present. In this case, the confidential process generating unit 32 starts the confidential process A21. At this time, the confidential process generating unit 32 has confidential shared data which should be shared only between the confidential processes and is used in the confidential processes immediately after the start. The confidential process generating unit 32 transfers the shared data to the confidential process A21 at the same time as the start of the confidential process A21.

Step 3 (Transmission Destination Changing Step):

The confidential process generating unit 32 changes setting of the communication interface 21a for an RPC program set in the started confidential process A21. More specifically, a transmission destination of RPC, which is set as the third party process 43 in a process table included in the confidential process A21, is changed from the third party process 43 to the relay process 23 by the confidential process generating unit 32.

Step 4:

Thereafter, a start of the confidential process A21 is initiated. The confidential process A21 then executes RPC directed to the third party process 43 by using the communication interface 21a and makes an attempt to generate the confidential process B22 as a new process to become a communication party, based on a program. At this time, in the normal processes, the third party process 43 representatively generates a process to become a communication party. However, as stated above, an opposite party of RPC to be seen from the confidential process A21 is changed to the relay process 23. Accordingly, the relay process 23 receives the RPC sent from the confidential process A21.

Step S5:

Next, the relay process 23 collates contents of the RPC received from the confidential process A21 with communication interface specifications received from the communication interface specification obtaining unit 31. Then, the relay process 23 determines whether the RPC relates to generation of the confidential process B22, namely, whether the PRC is a start request.

Step S6 (Relay Step):

If the RPC received from the confidential process A21 is a request to start the confidential process B22 (Yes in the step S5), the relay process 23 generates the confidential process B22 and also transfers shared data to the confidential process B22. Therefore, the confidential process B22 can use the confidential shared data immediately after activation.

Step S7:

The relay process 23 further notifies the third party process 43, which manages communication between the processes, namely, the RPC, of completion of generation of the confidential process B22. The third party process 43b which received the notification can manage the RPC thereafter between the confidential processes A21 and B22.

Step S8:
Thereafter, the relay process 23 cuts off the RPC between the confidential process A21 and the relay process 23. The relay process 23 then waits for RPC called from the confidential process A21 again in the step S4.

Step S9:
Meanwhile, if the RPC received from the confidential process A21 is not a request to start the confidential process B22 in the step S5 (No in the step S5), the relay process 23 relays simple communication data so as to carry out RPC between the confidential process A21 and the confidential process B22.

Step S10:
After the relay, the relay process 23 cuts off the RPC between the confidential process A21 and the confidential process B22.

Note that, if RPC is carried out between the two processes via the relay process with no presence of an opposite party process or with an opposite party process having no confidential data, prior to entire RPC, the opposite party process is generated to execute a process in which confidential data is transferred before activation.

As described above, according to the computer system 1 according to the present exemplary embodiment, shared data transferred from the confidential process A21 to the confidential process B22 is not notified to the third party process 43 which carries out process management. Accordingly, leakage of confidential shared data is suppressed. Meanwhile, a start of the confidential process B22 is notified from the relay process 23 to the third party process 43. Accordingly, process management is also realized.

[Modified Example]

The computer system 1 according to the present exemplary embodiment may also have a configuration as shown in FIG. 5. In FIG. 5, the computer system 1 is provided with the above processes including the confidential process A21, the confidential process B22, the relay process 23 and the third party process 43. Even in such a configuration, RPC and shared data sent from the confidential process A21 to the confidential process B22 are always relayed by the relay process 23. Accordingly, process generation and sharing of shared data can be realized without notification of shared data to the third party process 43. The third party process 43 also receives a notification of completion of generation of the confidential process B22, so that process management can also be carried out.

<Second Exemplary Embodiment>

A second exemplary embodiment of the present invention will be described next. In the second exemplary embodiment, a further concrete example of the computer system 1 shown in the above first exemplary embodiment will be described.

The computer system 1 according to the present exemplary embodiment is a personal computer in which Windows (registered trademark) is installed as the operating system 12. RPC management service called "RPCSS" (Remote Procedure Call Server Service) is implemented in Windows (registered trademark). "RPCSS" has a function to start, in response to a request of a transmission source of RPC, a process of a transmission destination and serves as the above third party process 43.

The above confidential process A21 is word processor software for document creation. The above confidential process B22 is spreadsheet software. The computer system 1 is further provided with each of the configurations described in the first exemplary embodiment, such as the communication interface specification obtaining unit 31, the confidential process generating unit 32 and the relay process 23.

It is assumed that a plurality of pre-encrypted documents and a "key" required to encrypt and decrypt these documents are recorded on a hard disk of the computer system 1. These documents and the key may also be obtained from other computers or the like. However, the key is strictly kept in the computer system 1 and it is only the confidential process generating unit 32 that can extract the key from the hard disk. As long as having the key, any processes can encrypt and decrypt documents. The "key" corresponds to the above confidential shared data (or usage data).

The confidential process generating unit 32 starts word processor software (confidential process A21) which is required for document browsing, and transfers the "key" to the word processor software. As a result, the word processor software can, by using the key, decrypt a read document. The word processor software can also encrypt a document in document saving. Note that, at the start of the word processor software, setting of the communication interface 21a in the word processor software (the confidential process A21) is changed by the confidential process generating unit 32. As a result, a generation command or RPC sent from the word processor software is transmitted to the relay process 23.

A general document may occasionally include a spreadsheet or the like in addition to a sentence. If the word processor software only has a function to display a sentence, spreadsheet software (the confidential process B22) is used in browsing and editing a spreadsheet. When a spreadsheet embedded in a document is detected, the word processor software (the confidential process A21) carries out RPC sent to the third party process 43 in order to generate spreadsheet software (the confidential process B22).

As stated above, setting of the communication interface 21a in the word processor software (the confidential process A21) is changed. Therefore, the RPC or the command to generate spreadsheet software (the confidential process B22) is transmitted to the relay process 23. The relay process 23 examines contents of the received RPC. More specifically, the relay process 23 determines, based on information pre-obtained from the communication interface specification obtaining unit 31, whether or not the RPC is a process generating command (a start request). If it is a process generating command, the relay process 23 starts spreadsheet software (the confidential process B22) by proxy. At this time, the relay process 23 also transfers the "key (shared data)" to the spreadsheet software (the confidential process B22) at the same time. As a result, the spreadsheet software can encrypt and decrypt document contents immediately after the start. The relay process 23 further notifies the RPCSS (the third party process 43) of the start of the spreadsheet software. The RPCSS can therefore manage RPC in the respective software.

Thereafter, information such as a spreadsheet to be displayed is exchanged between the word processor software (the confidential processor A21) and the spreadsheet software (the confidential process B22) by RPC via the relay process 23. As a result, the spreadsheet outputted by the spreadsheet software is displayed.

As described above, the "key" being confidential shared data is not notified to the third party process 43. Accordingly, key leakage to an irrelevant process is suppressed. That is, leakage of confidential data is suppressed efficiently. As a result, security is improved in the information processing system.

The present invention can be used for a computer system provided with a plurality of processes for processing shared data, in which RPC is carried out among the processes, and has industrial usability.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is the National Phase of PCT/JP2009/061573, filed Jun. 25, 2009, which is based upon and claims the benefit of priority from Japanese patent application No. 2008-175457 filed on Jul. 4, 2008, the disclosure of which is incorporated herein in its entirety by reference.

The invention claimed is:

1. An information processing system comprising:
   a processor;
   a first process, as executed by the processor, the first process being configured to execute a predetermined process and communicate with other processes;
   a second process configured to be started in response to a start request sent from said first process and execute a predetermined process;
   a management process configured to manage communication between said first process and said second process; and
   a relay process configured to receive said start request to said second process and usage data used in said first process and said second process from said first process, start said second process by proxy, transfer said usage data to said second process, and notify said management process of said start of said second process.

2. The information processing system according to claim 1, further comprising:
   a transmission destination setting unit configured to set said relay process as a transmission destination of data sent from said first process to said second process.

3. The information processing system according to claim 2, wherein said management process includes a function to receive a request start to another process from a process and starts said another process by proxy,
   wherein said transmission destination setting unit changes a transmission destination of data, which is sent from said first process to said second process, from said management process to said relay process.

4. The information processing system according to claim 2, further comprising:
   a process starting unit configured to start said first process and transfer said usage data to said first process,
   wherein when said process starting unit starts said first process, said transmission destination setting unit sets said relay process as a transmission destination of data sent from said first process to said second process.

5. The information processing system according to claim 2, wherein said management process is realized by a function which is pre-implemented in an operating system installed in said information processing system.

6. The information processing system according to claim 1, wherein said relay process determines, based on preset determination reference information, whether or not data received from said first process and sent to said second process includes said start request to said second process, and
   said relay process starts said second process by proxy, if said data includes said start request to said second process.

7. The information processing system according to claim 6, wherein said relay process relays and transmits data received from said first process to said second process, if said data received from said first process and sent to said second process does not include said start request to said second process.

8. A non-transitory computer-readable recording medium comprising code that, when executed, causes a computer to realize the following:
   a first process configured to execute a predetermined process and communicate with other processes;
   a second process configured to be started in response to a start request sent from said first process, and execute a predetermined process;
   a management process configured to manage communication between said first process and said second process; and
   a relay process configured to receive said start request to said second process and usage data used in said first process and said second process from said first process, start said second process by proxy, transfer said usage data to said second process, and notify said management process of said start of said second process.

9. The non-transitory computer-readable recording medium according to claim 8, further comprising code that, when executed, causes a computer to realize the following:
   a transmission destination setting unit configured to set said relay process as a transmission destination of data sent from said first process to said second process.

10. The non-transitory computer-readable recording medium according to claim 9, further comprising code that, when executed, causes a computer to realize the following:
    a process starting unit configured to start said first process and transfer usage data to said first process,
    wherein when said process starting unit starts said first process, said transmission destination setting unit sets said relay process as a transmission destination of data sent from said first process to said second process.

11. A data relay method in an information processing system, wherein said information processing system includes:
    a first process configured to execute a predetermined process and communicate with other processes;
    a second process configured to be started in response to a start request sent from said first process and execute a predetermined process;
    a management process configured to manage communication between said first process and said second process; and
    a relay process,
    said data relay method being executed by a processor and comprising:
    said relay process receiving said start request to said second process and usage data used in said first process and said second process from said first process;
    said relay process starting said second process by proxy;
    said relay process transferring said usage data to said second process; and
    said relay process notifying said management process of said start of said second process.

12. The data relay method according to claim 11, further comprising:
    setting said relay process as a transmission destination of data sent from said first process to said second process.

13. The data relay method according to claim 12, further comprising:
    starting said first process and transferring said usage data to said first process,
    wherein when said first process is started, said relay process is set as a transmission destination of data sent from said first process to said second process.

* * * * *